United States Patent [19]
Ishikawa et al.

[11] Patent Number: 6,027,221
[45] Date of Patent: Feb. 22, 2000

[54] SURFACE LIGHT SOURCE DEVICE OF SIDE LIGHT TYPE AND MOLD FOR LIGHT GUIDE PLATE EMPLOYED IN THE DEVICE

[75] Inventors: Tsuyoshi Ishikawa, Tokyo; Hiroshi Yamazaki, Higashimatsuyama, both of Japan

[73] Assignees: Enplas Corporation, Kawaguchi; Yasuhiro Koike, Yokohama, both of Japan

[21] Appl. No.: 08/904,348

[22] Filed: Jul. 31, 1997

[30] Foreign Application Priority Data

Aug. 5, 1996 [JP] Japan .................................. 8-221795

[51] Int. Cl.[7] ........................................................ F21V 7/04
[52] U.S. Cl. ............................. 362/31; 362/330; 362/331
[58] Field of Search ................................. 362/31, 26, 268, 362/330, 331, 332, 339

[56] References Cited

U.S. PATENT DOCUMENTS

| | | | |
|---|---|---|---|
| 5,126,882 | 6/1992 | Oe et al. | 359/619 |
| 5,833,344 | 11/1998 | Arai et al. | 362/31 |
| 5,844,720 | 12/1998 | Ohara et al. | 362/339 |

*Primary Examiner*—Michael H. Day
*Assistant Examiner*—Todd Reed Hopper
*Attorney, Agent, or Firm*—Staas & Halsey LLP

[57] ABSTRACT

In a surface light source device of side light type applied to a liquid crystal display or the like, a light control member is prevented from clinging to a light guide plate. The light guide plate is formed by means of injection molding with molds 16A and 16B. The molds 16A and 16B have an additional cavity 13 in a portion corresponding to a position close to an incidence surface of the light guide plate 11, with a gate G being arranged in the cavity. In the mold 16B, its inside surface corresponding to an emitting surface 12 is roughened. According to gradient in roughness, the emitting surface of a light guide plate to be manufactured is roughened so as to have uniform or graded roughness. On a center line C—C, the inside surface is much roughened in a portion distant from the cavity 13. Further, on a crossing line D—D, the inside surface is roughened so as to reduce the roughness according to distance from the center. If the gradient in roughness on the inside surface of the mold 16B is intensified, the emitting surface of the light guide plate may be roughened so as to have graded roughness. It is thereby possible to prevent clinging of the control member from occurring even when deformation of the light guide plate occurs. (FIG. 5*b*)

5 Claims, 7 Drawing Sheets

FIG. 1

11: SCATTERING GUIDE PLATE

1: SURFACE LIGHT SOURCE DEVICE OF SIDE LIGHT TYPE

FIG. 11 (PRIOR ART)

SURFACE LIGHT SOURCE DEVICE OF SIDE LIGHT TYPE AND MOLD FOR LIGHT GUIDE PLATE EMPLOYED IN THE DEVICE

BACKGROUND

1. Field of Invention

This invention relates to a surface light source device of side light type applied to a liquid crystal display or the like, and a mold for a light guide plate employed in the device, and more particularly, to a surface light source device of side light type employing a light guide plate with emitting directivity and a mold for forming the light guide plate.

2. Related Art

A surface light source device of side light type has been conventionally applied to a liquid crystal display, for instance, and illuminates a liquid crystal panel from the back surface. This arrangement is suitable to reduce thickness of the device as a whole.

In the surface light source device of side light type, a rod-shaped light source such as a cold cathode tube is usually employed as a primary light source to be arranged besides a light guide plate (a plate-shaped light guide). Illumination light emitted from the primary light source is introduced into the light guide plate through a side end surface of the light guide plate. The introduced illumination light propagates through the light guide plate, and in this process, emission of light from a major surface of the light guide plate occurs toward a liquid crystal panel.

A well-known light guide plate employed in the surface light source device of side light type described above includes a light guide plate of a type having an approximately uniform thickness and a light guide plate of a type showing a tendency to reduce thickness according to distance from the primary light source. Generally, light guide plates of the latter type emit illumination light more efficiently than the former type.

Figure 10:
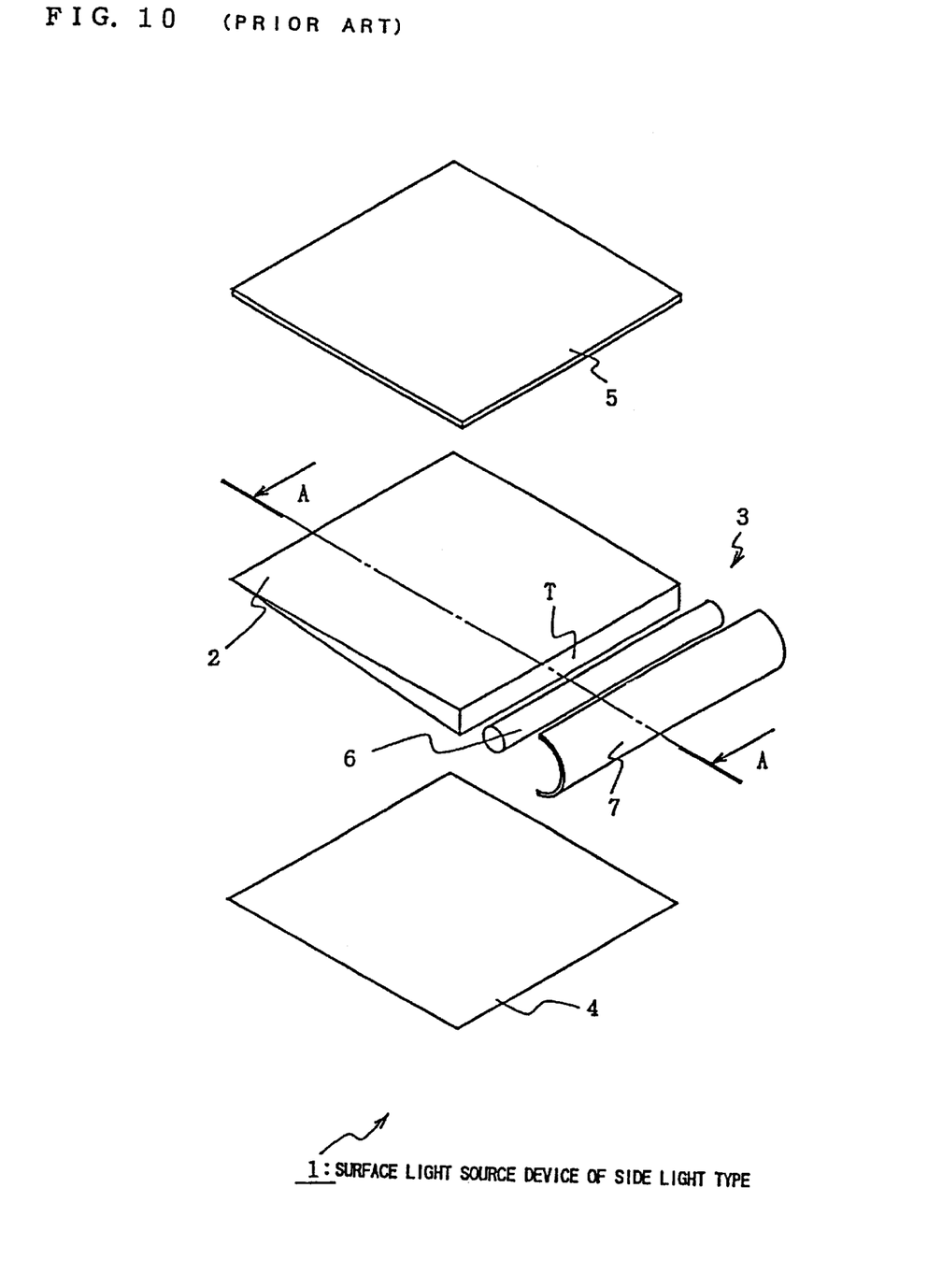
FIG. 10 is an exploded perspective view showing a surface light source device of side light type in a prior art.

FIG. 10 is an exploded perspective view showing a surface light source device of side light type employing light guide plate of the latter type. Referring to FIG. 10, a surface light source device of side light type 1 has a light scattering guide plate (a light guide plate made of a light scattering guide) 2, a primary light source 3 arranged on the lateral side of the light scattering guide plate, a reflection sheet 4 and a prism sheet 5 functioning as a light control member. The reflection sheet 4, the light scattering guide plate 2 and the prism sheet 5 are laminatedly arranged.

The primary light source 3 has a cold cathode tube (a fluorescent lamp) 6 and a reflection member (a reflector) 7 of an generally semi-circular section arranged around the cold cathode tube. Illumination light impinges on a side end surface of the light scattering guide plate 2 through an opening of the reflector 7. The reflection sheet 4 adopts a sheet-shaped regular reflection member made of metal foil or the like, or a sheet-shaped diffuse reflection member made of a white PET film or the like.

The light scattering guide plate 2 has a wedge-shaped section, and consists of a matrix made of polymethyl methacrylate (PMMA), for instance, and light transmitting fine particles uniformly distributed in the matrix and having deflective index different from that of the matrix.

Figure 11:
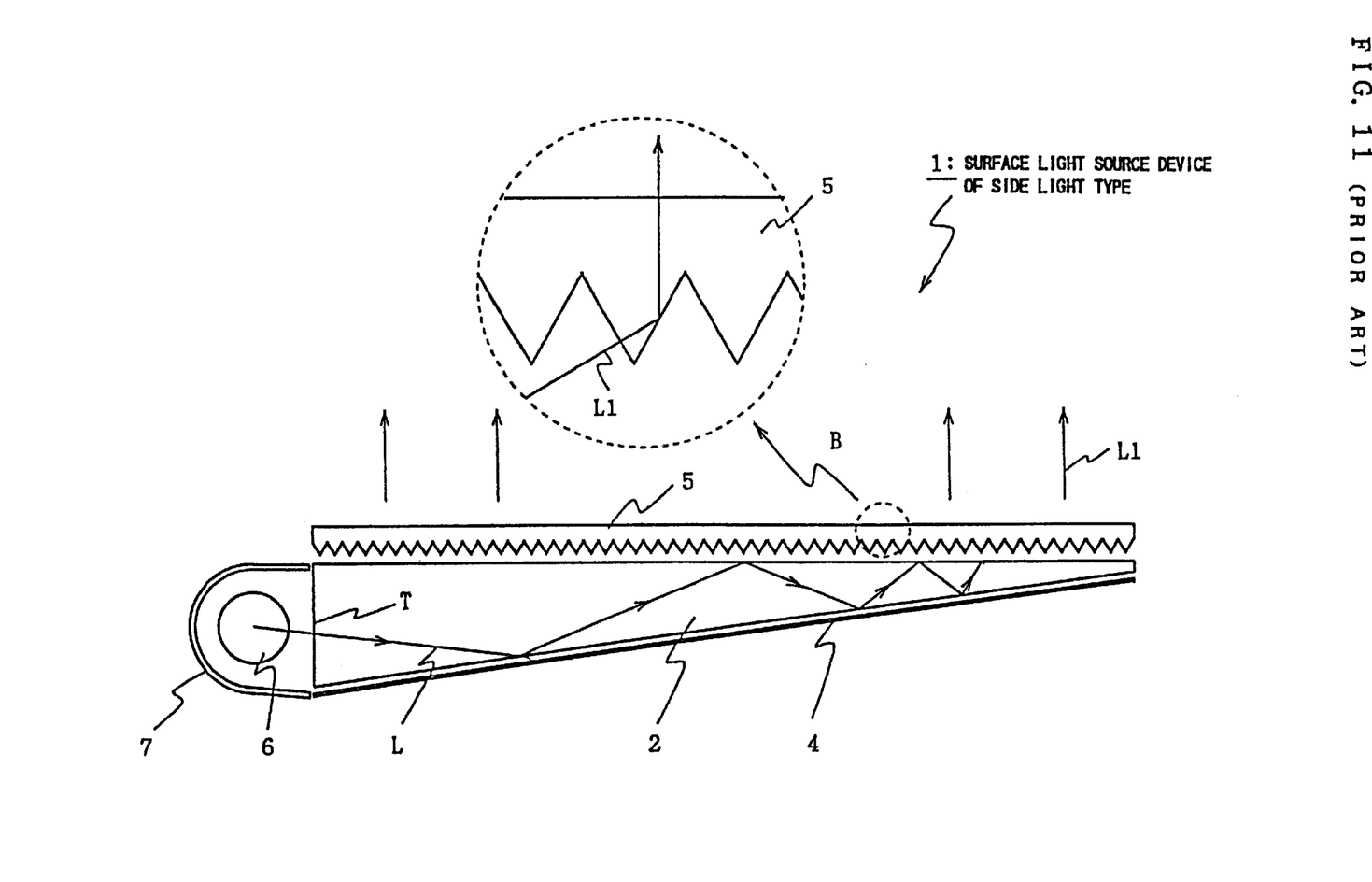
FIG. 11 is a sectional view taken along a line A—A in FIG. 10.

FIG. 11 shows a section taken along a line A—A in FIG. 10. Referring to FIG. 8, illumination light L from the primary light source 3 is introduced into the light scattering guide plate 2 through an incidence surface T provided by a side end surface of the light scattering guide plate 2, and makes a propagation toward an end portion while undergoing repetitive reflection between a plane (which will be hereinafter referred to as "a slope"), along which the reflection sheet 4 is disposed, and a plane (which will be hereinafter referred to as "an emitting surface"), along which the prism sheet 5 is disposed. In the process, the illumination light L undergoes scattering caused by the light transmitting fine particles. If a reflection sheet 4 is made of a diffuse reflection member, the illumination light is affected by an action of diffuse reflection as well.

Every time the illumination light L repeats reflection on the slope, angle of incidence with respect to the emitting surface is reduced little by little. Reduction in angle of incidence results in an increase of a component equal to the critical angle or less with respect to the emitting surface, urging emission from the emitting surface onward. It is thereby possible to prevent output light from being insufficient in an area distant from the primary light source 3.

Illumination light L1 emitted from the emitting surface undergoes scattering caused by the light transmitting fine particles or diffuse reflection caused by the reflection sheet 4, and therefore, shows the properties of scattered light. However, a main propagation direction of the emitted illumination light L1 is tilted toward an end portion (a direction reverse to the primary light source 3) with respect to the emitting surface. That is, the emitted illumination light L1 has directivity. The surface light source device of side light type 1 employing the above light guide plate generates illumination light having emitting directivity.

The prism sheet 5 is made of a light transmitting sheet material such as polycarbonate and has a prism surface. The prism sheet 5 is arranged so that the prism surface faces the light scattering guide plate 2. The prism surface is composed of a large number of projections, each of which has a triangular section and runs substantially parallel to the incidence surface T of the light scattering guide plate 2. The prism sheet 5 modifies a main emitting direction of the emitted illumination light L1 with a slope of each projection so as to emit the illumination light L1 in a frontal direction of the emitting surface. There is also a case where a prism sheet having prism surfaces on both surfaces is used. In this case, projections forming one prism surface run in a direction respectively orthogonal to projections forming the other prism surface.

In general, the surface light source device of side light type 1 employing the light guide plate of the wedge-shaped section as described above emits illumination light in a frontal direction more efficiently than surface light source devices of side light type employing light guide plates substantially uniform in thickness.

In some cases, surface light source devices of side light type may employ, as a light guide plate with emitting directivity, a light guide plate having a scattering film, a roughened surface or the like formed on one surface and/or the other surface (i.e. on emitting surface and/or a back surface) of a transparent member or a semi-transparent member in the shape of a wedge or the like. Such light guide plates also emit illumination light in a frontal direction efficiently.

OBJECT AND SUMMARY OF INVENTION

Figure 12:
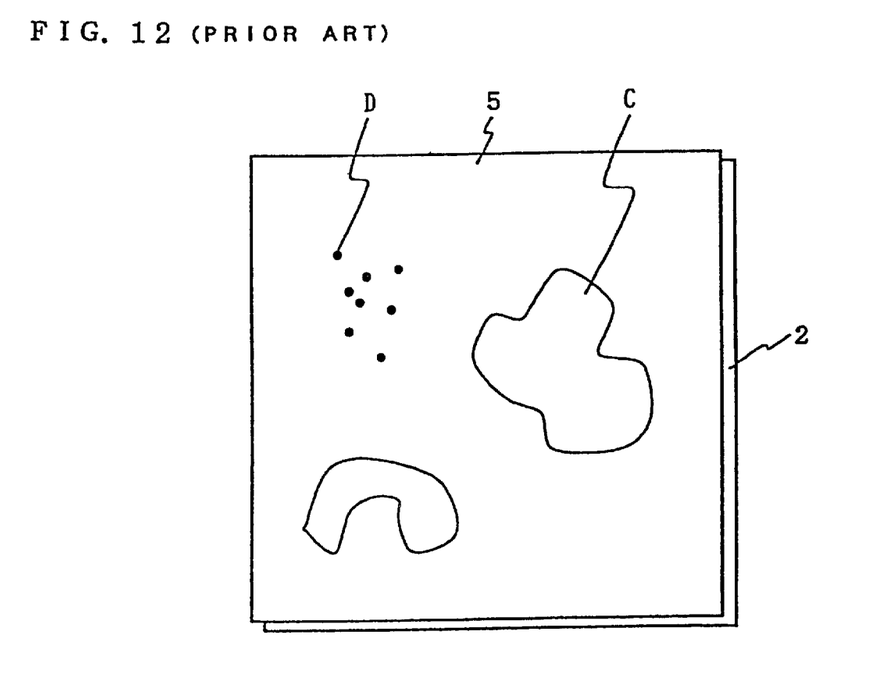
FIG. 12 is a front view for explaining clinging of a prism sheet to an emitting surface in a surface light source device of side light type in a prior art.

According to our observation, surface light source devices of side light type as described above placed in a high-temperature environment for a long time show various patterns on an outside surface (an emitting surface of the surface light source device of side light type) of the prism sheet 5, as shown in FIG. 12.

As the result of making a study of factors leading to such various patterns, it has been found out that the prism sheet 5 locally clings to the emitting surface of the light guide plate 2 and an air layer between the prism sheet 5 and the emitting surface is partially lost, resulting in occurrence of such patterns.

When the prism sheet 5 clings to the emitting surface of the light guide plate 2 to cover a certain extent, an insular-shaped pattern C occurs, while when the prism sheet 5 clings in the shape of dots to the emitting surface of the light guide plate 2, a dot-shaped pattern D occurs. Such patterns remarkably degrades a quality in display, when the surface light source device of side light type is applied to back lighting in a liquid crystal display.

An object of the present invention is to prevent a light control member from clinging to an emitting surface of a light guide plate employed in a surface light source device of side light type. Another object of the present invention is to enhance applicability of a surface light source device of side light type to back lighting in a liquid crystal display or the like by avoiding such a clinging phenomenon.

A further object of the present invention is to provide a mold suitably used to form a light guide plate required to prevent the above clinging phenomenon from occurring in a surface light source device of side light type.

The present invention prevents a light control member from clinging to an emitting surface by improving a surface light source device of side light type comprising a light guide plate with emitting directivity, a light source for supplying illumination light through a side end surface of the light guide plate, and a light control member arranged along the light guide plate so as to modify directivity of illumination light emitted from an emitting surface. The light guide plate is preferably shaped to have thickness which is reduced according to distance from a side end surface subjected to supply of light.

According to a feature of the present invention, the emitting surface is roughened without losing emitting directivity of the light guide plate for the purpose of preventing clinging from occurring. Although it is possible to uniformly roughen the emitting surface, the roughness of the emitting surface is preferably intensified in a portion distant from the side end surface supplied with illumination light for the purpose of enhancing a function of preventing clinging from occurring in deformation.

The present invention also provides a mold for forming a light guide plate employed in the surface light source device of side light type as described above. An inside surface of the mold is roughened in a portion corresponding to an emitting surface of the light guide plate. The roughness of the inside surface is intensified in an area distant from another area corresponding to the vicinity of a side end surface subjected to supply of light in the light guide plate, in comparison with the area corresponding to the vicinity of the side end surface described above. As the result of adjusting the degree of intensification in roughness, it is possible to roughen the emitting surface of the light guide plate provided as a molded product so as to have uniform or graded roughness.

Hereinafter will be described the present invention in more detail with reference to accompanying drawings.

PREFERRED EMBODIMENTS

In the following description, the reference numerals used in FIGS. 10, 11 and 12 are accordingly used in common to avoid repeated descriptions.

(1) First Embodiment

Figure 1:
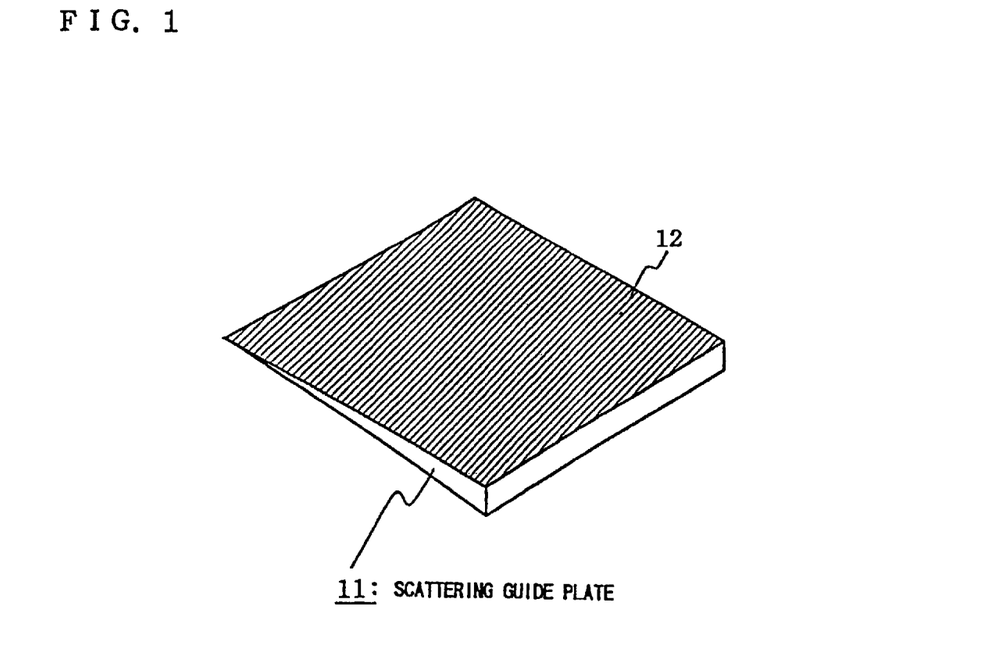
FIG. 1 is a perspective view showing a light guide plate (a light scattering guide plate) employed in a surface light source device of side light type according to the first embodiment of the present invention.

FIG. 1 is a perspective view showing a light guide plate, which is employed in a surface light source device of side light type according to the first embodiment of the present invention. The surface light source device of side light type in the present invention is identical with the surface light source device of side light type described with reference to FIGS. 10 and 11, except that an emitting surface 12 of a light guide plate 11 with emitting directivity is roughened.

The light guide plate 11 is made of a light scattering guide, and the emitting surface 12 of the light guide plate is matted so as to form a matted surface (a roughened surface) having uniform roughness such that arithmetic mean roughness Ra is in the range of 0.02 to 0.25 $\mu$m.

Arithmetic mean roughness Ra denotes a unit of surface roughness defined by JIS B0031-1994. The roughening in the emitting surface effectively prevents a prism sheet 5 functioning as a light control member from clinging to the emitting surface 12.

Figure 2:
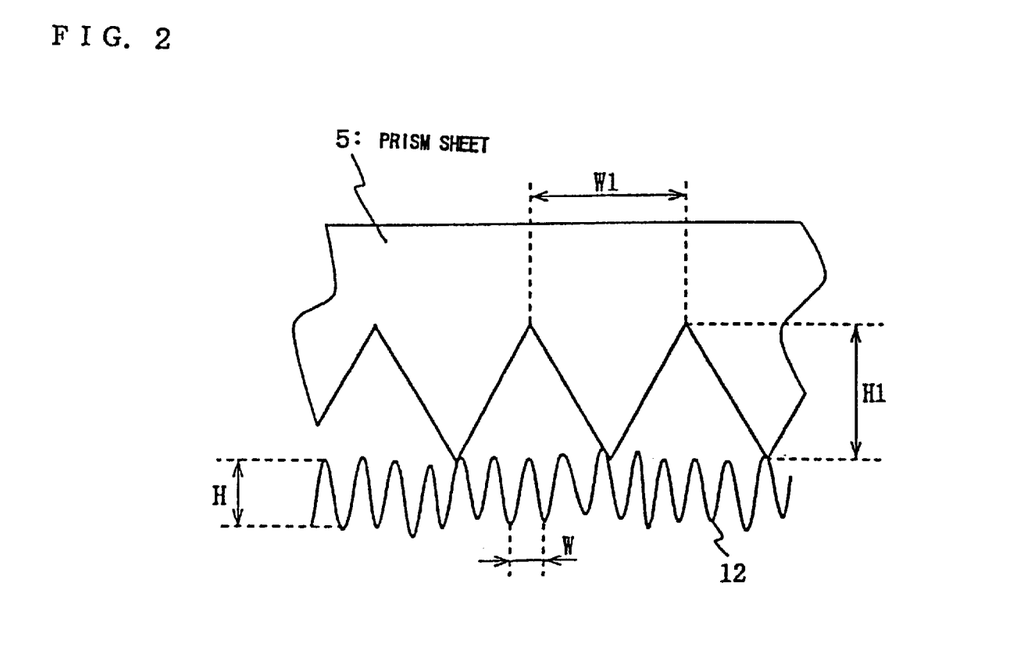
FIG. 2 is an enlarged-scale sectional view showing an emitting surface of the light guide plate shown in FIG. 1.

A description will now be given of the reasons with reference to FIG. 2 showing an enlarged section of the prism sheet 5 and that of the emitting surface 12 respectively employed in this embodiment. The prism sheet 5 is a molded product made of polycarbonate and has a large number of projections, each of which has a triangular section. In each projection of this embodiment, a height H1 is in the range of 20 to 40 $\mu$m, and each pitch W1 is 50 $\mu$m.

The emitting surface 12 is roughened through the above matting treatment, and as a result, a large number of irregular portions are formed at random on the emitting surface 12. In each irregular portion, a depth H is in the range of 0.05 to 0.2 μm, and a mean pitch W is in the range of 5 to 40 μm. Since these irregular portions hold the prism sheet 5 at their tip portions, adhesiveness between the prism sheet 5 and the emitting surface 12 is reduced, thereby effectively preventing the prism sheet 5 from changing.

Figure 3:
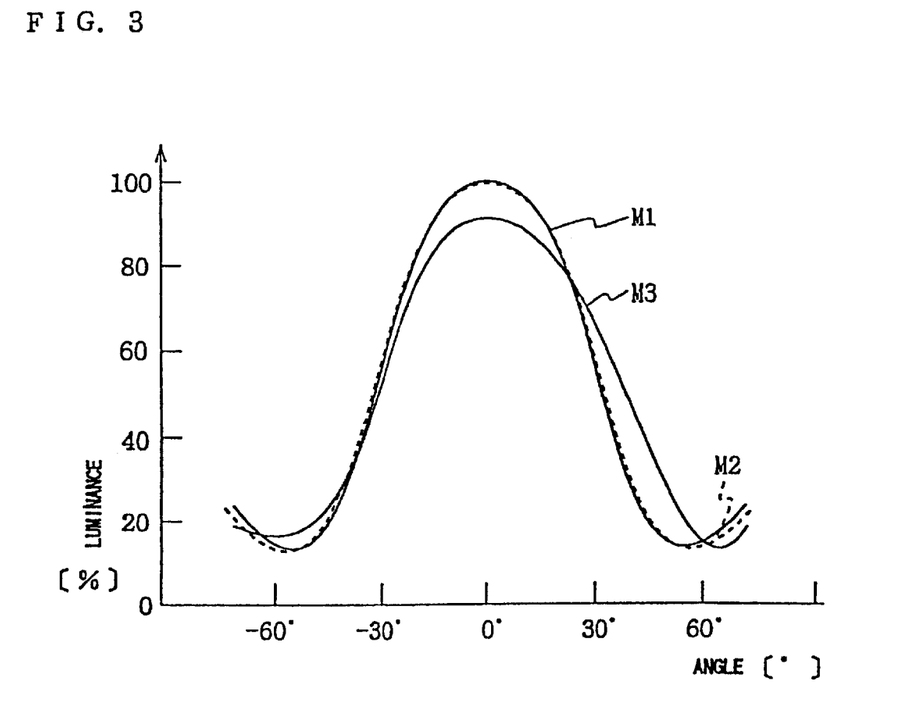
FIG. 3 is a graph for explaining influence of roughening in a light guide plate upon directivity.

However, the roughened emitting surface 12 generates scattered output light, and as a result, reduces directivity of output light. This fact is illustrated in a graph of FIG. 3 showing directivity in a case of employing the light guide plate shown in FIG. 1. In this graph, the transverse axis represents emitting angle of illumination light emitted through the prism sheet 5, and the ordinate axis represents relative luminance. The direction perpendicular to the emitting surface 12 is defined as an angle of 0°, and directions approaching an end in a wedge shape is defined as positive direction. Curves respectively denoted by reference numerals M1, M2 and M3 correspond to three roughness conditions concerning the emitting surface of the light guide plate.

Curve M1: specular surface

Curve M2: roughened surface of 0.2 μm in arithmetic mean roughness Ra

Curve M3: roughened surface of 0.3 μm in arithmetic mean roughness Ra

In comparison of these curves with one another, there is no great difference in directivity between the curve M1 (specular surface) and the curve M2 (Ra=0.2 μm), while a remarkable deduction in directivity occurs in the curve M3 (Ra=0.3 μm). It is read from a comparison between the curve M3 and the curve M1 that luminance (quantity of light) in a frontal direction is reduced about 10%.

Figure 4:
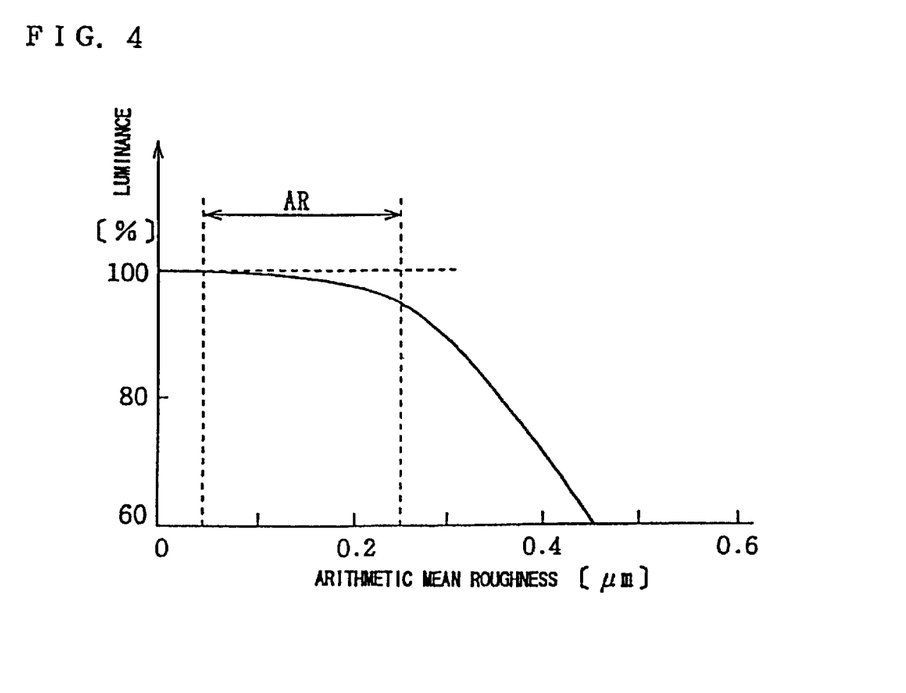
FIG. 4 shows a characteristic curve of luminance in a direction perpendicular to an emitting surface, with roughness being set as a parameter.

A graph of FIG. 4 will give an understanding of an influence of roughening in the light guide plate upon directivity in more detail. The graph of FIG. 4 shows the result of measurement in luminance (the ordinate axis) in a direction perpendicular to the emitting surface on condition that the roughness (arithmetic mean roughness Ra) of the emitting surface of the light guide plate is set as a parameter (the transverse axis).

As is read from this graph, when the arithmetic mean roughness Ra reaches 0.25 μm or above, directivity is sharply deteriorated, and a luminance level in a frontal direction is reduced. Such a reduction in luminance level is not a preferable matter.

On the other hand, for the purpose of verifying a performance of preventing clinging of the prism sheet 5 from occurring by means of roughening the emitting surface 12 of the light guide plate 11, the prism sheets 5 were respectively laminated on a light guide plate 11 having an emitting surface 12 roughened so as to have various degrees of roughness, and the resultant was allowed to stand for 1000 hours in an environment at the temperature of 70° and the humidity of 20%. As the result of making observations of clinging of the prism sheet 5 after the resultant has been allowed to stand for 1000 hours, it came out that clinging easily occurs when Ra is approximately 0.02 μm or less, while clinging hardly occurs when Ra is approximately 0.02 μm or above.

From the above fact, the emitting surface 12 of the light guide plate 11 should be roughened in order to avoid deterioration of directivity and clinging of the prism sheet 5, preferably on condition that the arithmetic mean roughness Ra is within the range of 0.02 to 0.25 μm.

Figure 5A:
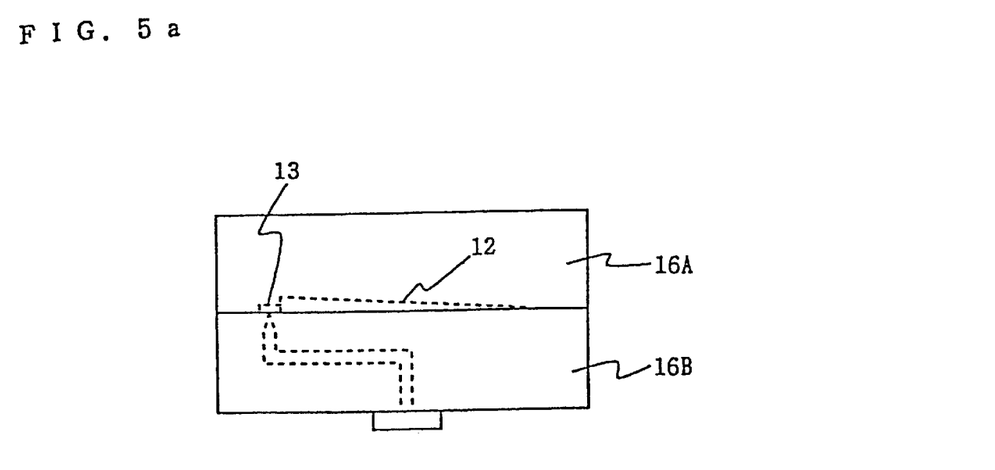
FIG. 5a is a side view for explaining a mold used for manufacturing the light guide plate shown in FIG. 1.
Figure 5B:
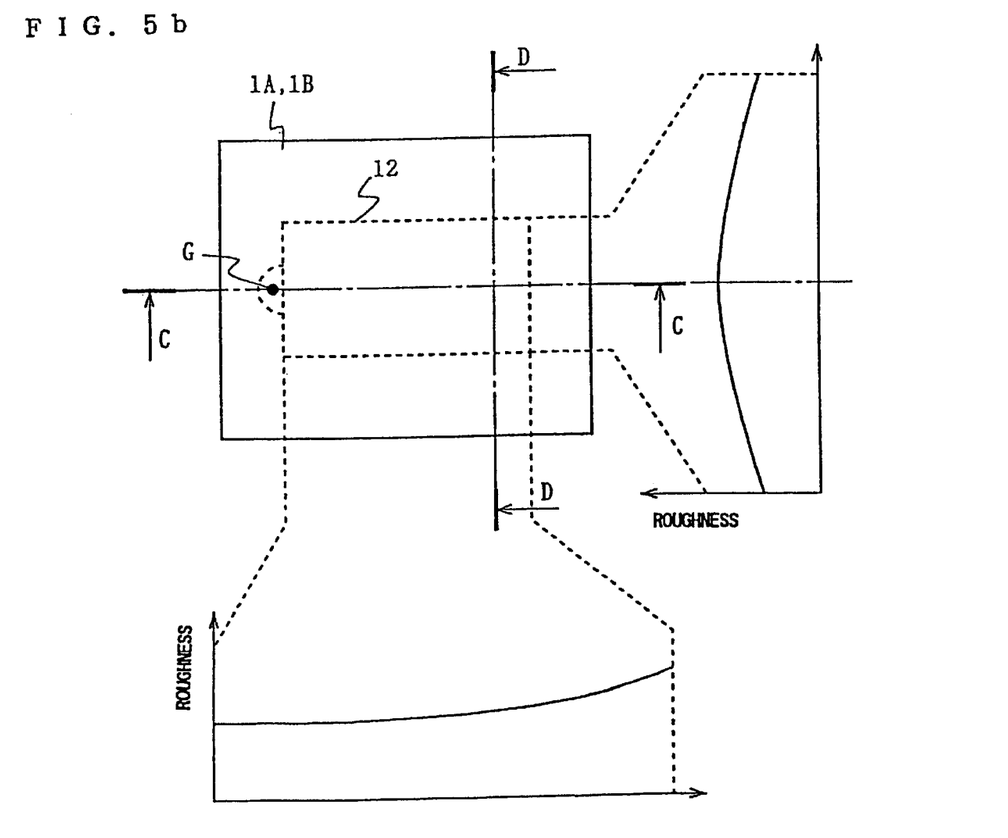
FIG. 5b is a plan view for explaining a mold used for manufacturing the light guide plate shown in FIG. 1, together with a graph for explaining a distribution of roughness on an inside surface of the mold.

FIGS. 5a and 5b are a side view and a plan view respectively showing a mold used for forming the light scattering guide plate 11 by means of injection molding. Molds 16A and 16B have an additional cavity 13 in a portion corresponding to a position close to an incidence surface of the light guide plate 11. The cavity 13 is provided with a gate G. In the molds 16A and 16B, it is thereby possible to surely form the light guide plate 11 by allowing a resin to flow from a portion corresponding to a thick end portion (an incidence surface) of the wedge-shaped light guide plate toward a portion corresponding to a thin end portion (an end portion) of the wedge-shaped light guide plate.

In the mold 16B out of the molds 16A and 16B, an inside surface corresponding to the emitting surface 12 is roughened. Irregularities of the roughened surface of this mold are transferred to a molded product (the light guide plate 11), and as a result, the roughened emitting surface 12 is formed.

Further, in the mold 16B, the inside surface is roughened as described above for forming the emitting surface 12 so that the roughness is graded. That is, as shown in a graph, the inside surface is roughened so as to intensify the roughness according as distance from the incidence surface is increased, in a center line C—C of the light guide plate 11 orthogonal to the incidence surface.

Further, the inside surface is roughened so as to reduce the roughness in the vicinity of the end of the light guide plate 11 according as distance from the center is increased, in a crossing line of D—D parallel to the incidence surface.

Such a gradient in roughness as described above is required for approximately uniformly roughening the emitting surface 12 in actuality under the molding conditions suitable for manufacturing the light guide plate 11 of this kind. The reasons why such a gradient in roughness is required are as follows.

Figure 6:
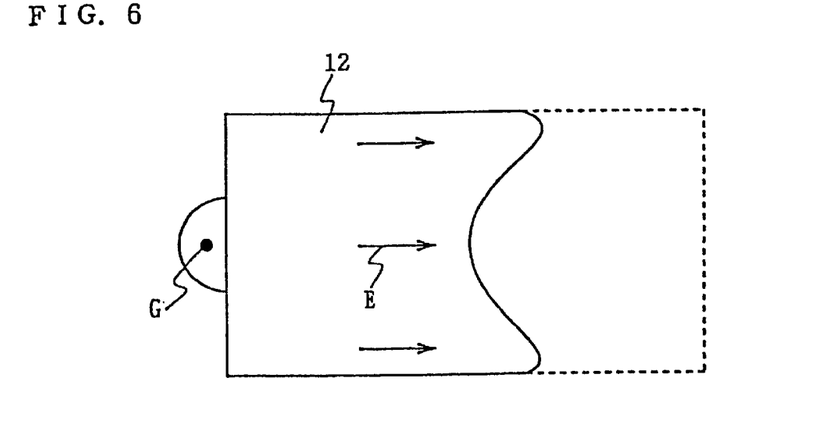
FIG. 6 is a plan view showing a flow of a resin in case of forming the light guide plate shown in FIG. 1.

As shown in FIG. 6, when a thin plate-shaped product having a wedge-shaped section like the light guide plate 11 is molded by forming the gate G on one end surface, a resin having flown into the cavity preferentially flows toward an easily flowing direction. In this case, the resin flows in a direction along the incidence surface, and thereafter flows toward the end in the wedge shape as shown by an arrow E.

Figure 7:
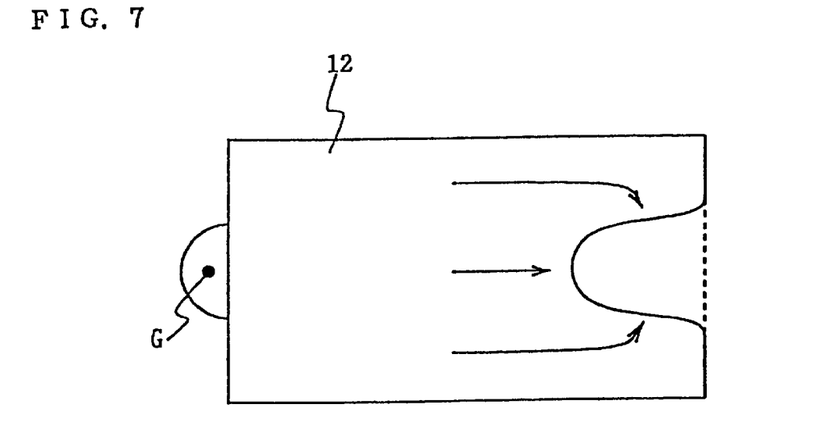
FIG. 7 is a plan view showing a flow of a resin in forming, subsequently to the flow shown in FIG. 6.

At this time, the resin at both end portions flows ahead of that at a center portion, and lastly flows in a center portion at the end in the wedge shape, as shown in FIG. 7.

The advantage of introduction of the resin through a single gate corresponding to the position of the incidence surface is that a weld line is prevented from occurring, in comparison with a case where the gate is provided in a plurality of portions. However, as described above, in a portion, into which the resin lastly flows, fluidity of the resin is reduced more than that in other portions, and as a result, capability of transferring the irregularities formed on the inside surface of the mold is reduced.

Figure 8:
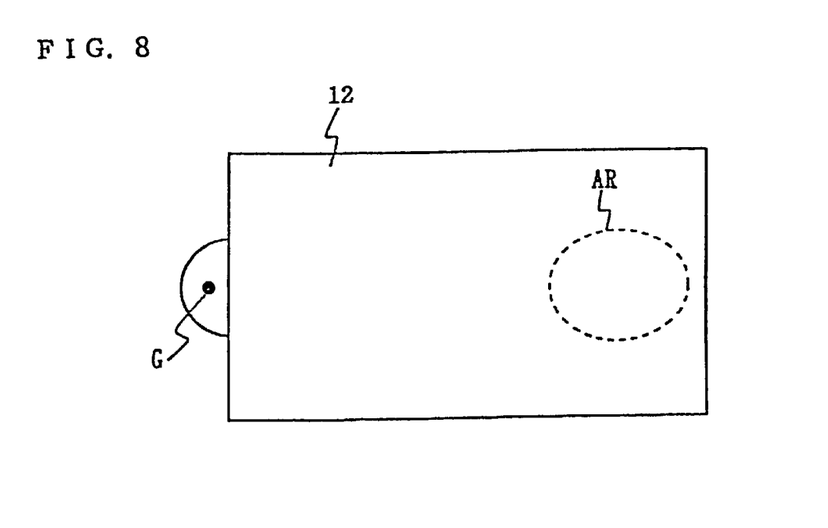
FIG. 8 is a plan view for explaining a case where clinging of a prism sheet occurs when an inside surface of a mold is uniformly roughened.

That is, if the light guide plate were manufactured by means of injection molding without giving any gradient in roughness to the inside surface of the mold, clinging of the prism sheet would easily occur in a portion corresponding to an area (see reference character AR) where fluidity of the resin is reduced, as shown in FIG. 8. In the present embodiment, the gradient in roughness is given to the inside surface of the mold 16b as described above for the purpose of avoiding the above drawback.

In this manner, according to this embodiment, it is possible to effectively prevent the prism sheet 5 from clinging to the light guide plate 11, and also to avoid the quality of output light from being deteriorated by clinging of the prism sheet.

(2) Second Embodiment

In the second embodiment, the gradient in roughness on the inside surface of the mold is intensified more than that in the first embodiment. It is thereby possible to give a gradient in roughness also to the emitting surface 12 of the light guide plate 11 within the range of roughness described above. The gradient in roughness is given to the emitting surface 12 so as to intensify the roughness toward the end in the wedge shape.

Figure 9:
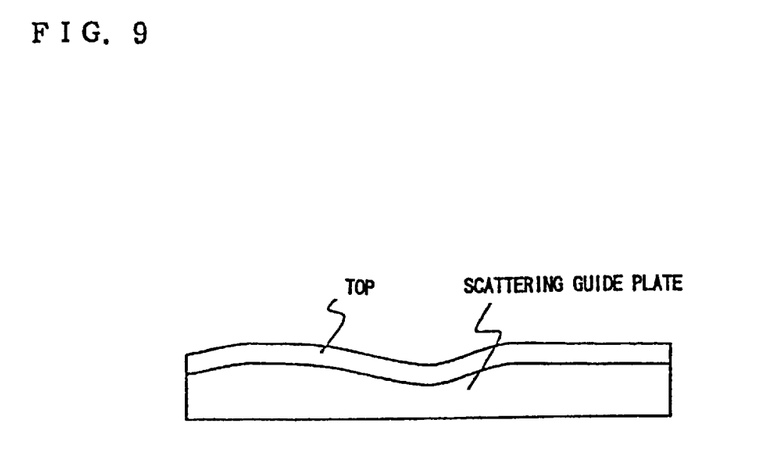
FIG. 9 is a side view showing deformation occurring in a light guide plate when residual stress is relieved.

The gradient in roughness on the emitting surface 12 is advantageous in solving a problem resulting from corrugate deformation having a tendency to occur in the vicinity of the end in the wedge shape. That is, in an area (see reference character AR in FIG. 8) where fluidity of the resin is reduced, residual stress easily occurs inside the molded product (the light guide plate 11). When this residual stress is relieved due to factors such as a great change in temperature in the course of a molding process, corrugate deformation easily occurs in the vicinity of the end. FIG. 9 is a side view showing deformation occurring in the light guide plate when residual stress is relieved. It should be noted that the size of deformation in FIG. 9 is exaggerated.

When such deformation occurs, press force between a protuberant portion and the prism sheet 5 becomes different from that between a recess portion and the prism sheet 5. In the protuberant portion, clinging of the prism sheet 5 very easily occurs.

In this embodiment, the emitting surface 12 of the light guide plate 11 is roughened so as to intensify the roughness in the vicinity of the end in the wedge shape, and as a result, it is possible to prevent the prism sheet 5 from clinging to the emitting surface 12 even if the deformation as described above occurs. Further, it is possible to prepare a mold, in which roughness on the inside surface in an area (corresponding to a portion of the emitting surface in the vicinity of the end of the wedge-shaped light guide plate) distant from the cavity 13 is intensified more than that in the first embodiment, for forming such the light guide plate.

(3) Further Embodiment

In the above embodiments, while the prism sheet having a single prism surface is employed as a light control member, the present invention is not limited to the above embodiments. As a matter of course, the present invention may be also applied to a surface light source device of side light type employing a prism sheet (a so-called double prism sheet) having both surfaces formed into prism surfaces.

Further, the light scattering guide plate having the wedge-shaped section is employed as a light guide plate. However, the present invention is not limited to the above light scattering guide plate. In addition to a light guide plate generally showing a tendency to reduce thickness according as the light scattering guide plate becomes more distant from a light source, it may be possible to employ a plate-shaped light scattering guide plate. The light guide plate may be made of a transparent light guiding material, instead of the light scattering guide.

Further, in the above embodiments, discussion has been given on a case where illumination light is introduced through one side end surface, the present invention is not limited to the above embodiments, and may be applied also to a surface light source device of side light type having a structure of introducing illumination light through one side end surface together with the other side end surface.

Further, in the above embodiments, a description has been given of a case where the present invention is applied to the surface light source device for a liquid crystal display, the present invention is not limited to the above embodiments. The present invention may be widely applied to a surface light source device of side light type for various illumination apparatuses and displays.

As described above in detail, the present invention prevents a light control member employed in a surface light source device from clinging to an emission surface and also prevents uniformity in illumination from decreasing which would be caused by the clinging. Further, the present invention provides a mold for forming the light guide plate employed in the surface light source device of side light type described above.

What is claimed is:

1. A surface light source device of side light type comprising:
    a light guide plate with emitting directivity;
    a light source for supplying illumination light through a side end surface of the light guide plate which has an emitting surface to emit said illumination light; and
    a light control member arranged along said emitting surface to modify directivity of the illumination light emitted from said emitting surface,
        wherein said emitting surface is provided with roughness to prevent said light control member from clinging to said emitting surface, without losing emitting directivity of said light guide plate,
        said roughness being intensified in a portion distant from said side end surface.

2. A surface light source device of side light type according to claim 1, wherein said light guide plate is shaped so as to have thickness which is reduced according to distance from said side end surface.

3. A mold used for forming a light guide plate employed in a surface light source device of side light type, which includes a light guide plate with emitting directivity, a light source for supplying illumination light through a side end surface of the light guide plate which has an emitting surface to emit said illumination light, and a light control member arranged along said emitting surface to modify directivity of illumination light emitted from said emitting surface, said emitting surface being roughened without losing emitting directivity of said light guide plate to prevent said light control member from clinging to said emitting surface, wherein an inside surface of said mold is roughened in a portion corresponding to said emitting surface of said light guide plate; and
    the roughness given to the inside surface of said mold is intensified in an area distant from another area corresponding to the vicinity of the side end surface of said light guide plate, in comparison with the area corresponding to the vicinity of said side end surface.

4. A mold according to claim 3, wherein the roughness given to the inside surface of said mold is intensified in an area distant from another area corresponding to the vicinity of the side end surface of said light guide plate, in comparison with the area corresponding to the vicinity of said side end surface, so as to give uniform roughness to said emitting surface of said light guide plate.

5. A mold according to claim 3, wherein the roughness given to the inside surface of said mold is intensified in an area distant from another area corresponding to the vicinity of the side end surface of said light guide plate, in comparison with the area corresponding to the vicinity of said side end surface, so as to give intensified roughness to said emitting surface of said light guide plate in a portion distant from the side end surface supplied with said illumination light.

* * * * *